United States Patent Office 3,618,301
Patented Nov. 9, 1971

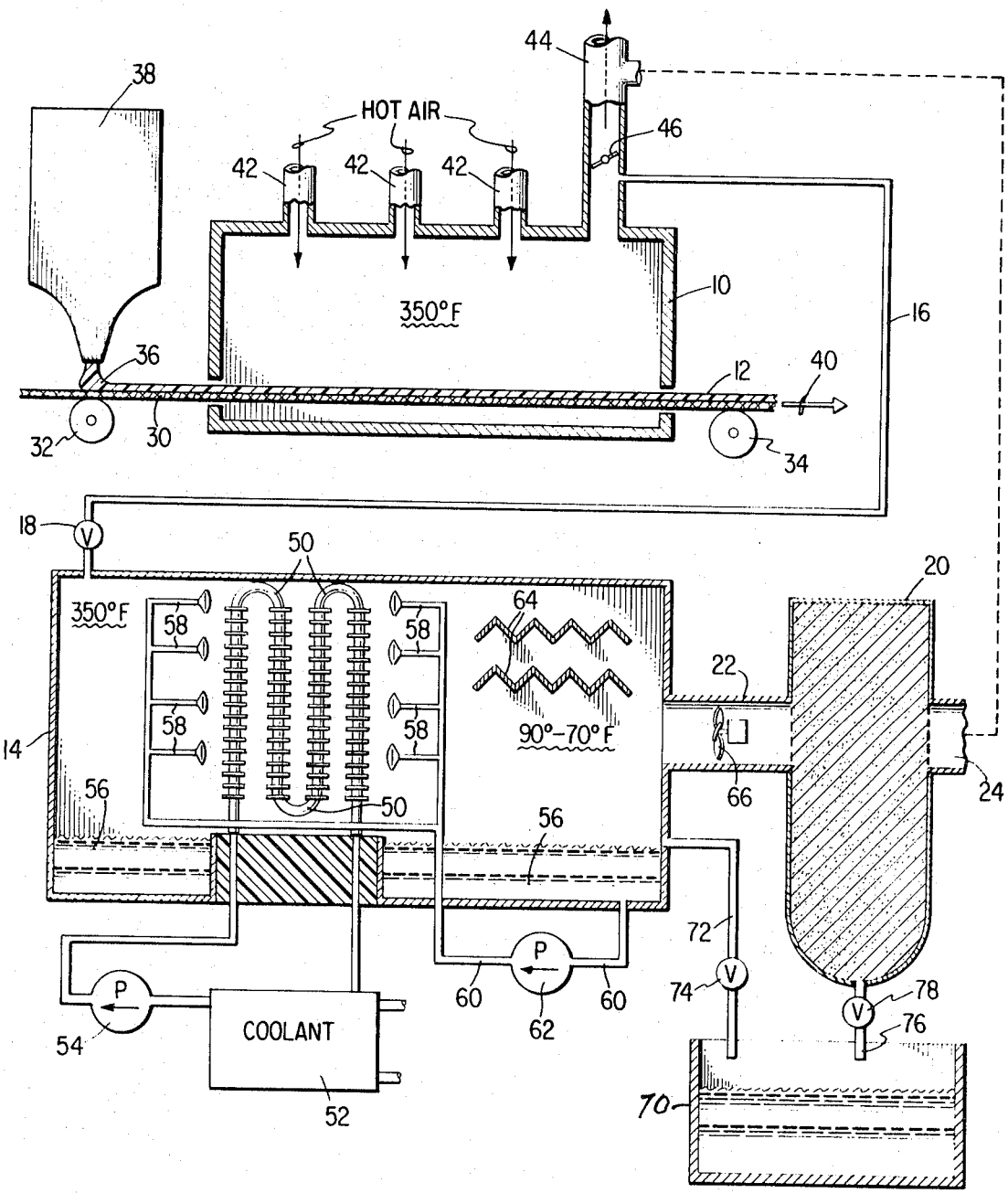

3,618,301
PROCESS AND APPARATUS FOR REMOVING AIR POLLUTANTS FROM OVEN-STACK EMISSIONS
Norman J. Handman, Cherry Hill, N.J., assignor to Clermont Engineering Company, Incorporated
Filed Mar. 11, 1969, Ser. No. 806,155
Int. Cl. B01d 47/06
U.S. Cl. 55—89          4 Claims

ABSTRACT OF THE DISCLOSURE

A system for preventing hot noxious vapors, comprising aerosols of organic materials emanating from an oven in a manufacturing process, from polluting the atmosphere through oven-stack emissions comprises a spray chamber, finned cooling coils disposed within the spray chamber, and a mist eliminator communicating with the spray chamber. Hot gases emanating from the oven are cooled by the finned coils to provide a two-phase liquid condensate in the spray chamber. The finned coils are sprayed by the two-phase condensate, at high pressure, to scrub and clean the finned coils of accumulated tars and to agglomerate the aerosols in the spray chamber. Any aerosols emanating from the spray chamber are filtered by the mist eliminator.

BACKGROUND OF INVENTION

This invention relates generally to a system for controlling air pollution and recovering organic material, and more particularly to a process and apparatus for removing air pollutants from oven-stack emissions. The process and apparatus of the present invention are particularly useful for removing aerosols from hot oven gases resulting from a manufacturing process utilizing organic materials, such as plasticizers and organic mineral siprits, hereinafter referred to as "organics."

It has been proposed to remove noxious hot vapors, including liquid mist particles (aerosols) of organic materials of about one micron or smaller in diameter, from oven-stack emissions by scrubbing the hot vapors with water. The prior-art process, however, required large quantities of water and presented an unwieldy problem of disposing of the large quantity of contaminated water. Also, the extraction of organics from such large quantities of water was not practical because of the problems presented in storing the large quantities of water.

SUMMARY OF INVENTION

The improved apparatus for removing aerosols of organic materials from hot oven gases comprises a spray chamber connected to the oven to receive the hot aerosols, finned cooling coils disposed within the spray chamber, and a mist eliminator communicating with the spray chamber. The hot oven gases are cooled in the spray chamber by the finned cooling coils, a separate coolant being pumped through the finned coils. The cooled aerosols are condensed as a two-phase condensate (organics-water) and fall to the bottom of the spray chamber. The finned coils are sprayed with the two-phase condensate under high pressure to increase the heat transfer efficiency between the aerosols and the cooling coils, to scrub and clean the cooling coils of any condensed tars thereon, to clean the air stream of any dirt and dust carried over from the oven gases, and to agglomerate the aerosols into droplets that fall to the bottom of the spray chamber. Any cooled aerosols remaining in the spray chamber are filtered by the mist eliminator. The organic material is recovered from the two-phase condensate of the spray chamber and from the mist eliminator.

BRIEF DESCRIPTION OF THE DRAWING

The sole figure of the drawing represents an embodiment of an improved system for controlling air pollution and recovering organics from a process for manufacturing linoleum.

DESCRIPTION OF THE PREFERRED EMBODIMENT

The improved apparatus and process for preventing noxious vapors from a manufacturing operation from polluting the atmosphere will be described in connection with a manufacturing process for making linoleum, for illustrative purposes. It is, however, within the contemplation of the present invention for the improved apparatus and process to provide means for removing hot organic aerosols from oven-stack emissions in manufacturing processes wherein the average diameter of the aerosols is in the order of about one micron or less.

Referring now to the drawing, there is shown an oven 10 of the type used in the manufacture of linoleum 12 communicating with the input of a spray chamber 14 through a conduit 16 and a valve 18. The output of the spray chamber 14 is connected to the input of a mist eliminator 20 through a conduit 22, and the output of the mist eliminator 20 communicates with the atmosphere through a conduit 24, such as a stack vented to the atmosphere.

In the manufacture of the linoleum 12, a cloth 30, such as hessian fabric, for example, is passed through the oven 10 by any suitable conveying means such as rollers 32 and 34, for example. Linoleum cement 36 from a tank 38 is deposited on the cloth 30 as the cloth 30 enters the oven 10, the cloth 30 being moved in the direction of the arrow 40. The linoleum cement 36 may comprise oxidized linseed oil mixed with resins, such as kauri gum and fillers which must be cured. Plasticizers, such as dioctyl phthalate and mineral spirits, for example, are added to the linoleum cement for curing purposes.

Hot air at a temperature of about 350 degrees F. is introduced into the oven 10 through ports 42 to cure the liquid cement 36. During the curing process, aerosols, consisting of particles of the organic materials of the plasticizers, mineral spirits and resins from the coating 36, are formed within the oven 10. If these aerosols were permitted to pass directly into the atmosphere through a stack 44 communicating with the oven 10, the atmosphere would become dangerously polluted and present a serious health hazard to humans and animals that would be exposed to it. The aerosols of the organic particles are dispersed in the hot air and other gases, such as carbon dioxide, for example, formed in the oven 10 during the manufacturing process.

Means are provided to recover the pollutants, that is, the noxious vapors (aerosols) from the oven-stack emissions so as to render harmless the ultimate emission to the atmosphere. To this end, the hot noxious aerosols of organics are prevented from being emitted from the stack 44 by a closed damper 46, and the hot aerosols are passed into the inlet of the spray chamber 14 through the conduit 16 and the open valve 18. The hot aerosols are passed over a plurality of finned cooling coils 50. The finned cooling coils 50 are connected to a source 52 of a coolant at a temperature of about 55 degrees F. through a closed system including a pump 54.

The coolant may be any suitable liquid or gas, such as water or ammonia, for example, which may be reused continuously since it does not come in contact with the aerosols and is in a closed system.

Hot aerosols entering the spray chamber 14 at about 350 degrees F. are cooled to between 90 and 70 degrees F. after passing over the finned cooling coils 50. The hot oven gases passing over the finned cooling coils 50 cause the plasticizer fumes, solvents, and stream from the moisture in the air to condense and form a two-phase condensate 56, comprising a layer of organics floating on water at the bottom of the spray chamber 14. The two phases of the condensate 56 may form an emulsion.

The condensate 56 is pumped at high pressure to spray nozzles 58 through a conduit 60 and a high pressure pump 62. The nozzles 58 are directed onto opposite sides of the finned cooling coils 50 to increase the heat transfer efficiency between the aerosols and the finned cooling coils 50, to scrub and clean the finned cooling coils 50 of any accumulated tars and resins deposited from the hot vapors, to clean the vapors of any dirt and dust carried over by the oven gases, and to agglomerate the aerosols into much larger droplets so that they can be trapped easily by eliminators 64 disposed within spray chamber adjacent the outlet thereof. To accomplish these functions the pressure of pumping the condensate 56 should be between about 80 and 100 lbs. per square inch. This pressure is about four or five times that ordinarily used for air conditioning purposes. Also, the spraying of the condensate 56 should be from opposite sides of the finned cooling coils 50.

About eighty percent of the pollutants, mainly the aerosols, have been removed from the oven gases by the time they reach the outlet of the spray chamber 14. The oven gases are now blown to the mist eliminator 20 by a blower 66 disposed within the conduit 22 that communicates with the outlet of the spray chamber 14 and the mist eliminator 20. The mist eliminator 20 is preferably one of the type generally known as the "Brinks" demister type (Monsanto Company) for filtering aerosols of about one micron or less in diameter. The gases emanating from the mist eliminator 20 and passing through the stack 24 have less than ten percent of the volatilized organics originally present in the gases in the oven 10.

The two-phase condensate 56 can be collected in a recovery tank 70 through a drain 72 and an open valve 74 communicating with the spray chamber 14 and leading into the recovery tank 70. A drain 76 and an open valve 78 also communicate with the bottom of the mist eliminator 20 for draining the condensate from the mist eliminator 20 into the recovery tank 70. Thus, at least ninety percent of the volatile organics that would ordinarily pollute the atmosphere, if not recovered, are recovered by the improved method and apparatus. The recovered organics may be reused in the manufacturing process, thereby providing an economic use of materials.

I claim:

1. In a process of removing air pollutants from oven-stack emissions of the type comprising hot noxious aerosols, said aerosols comprising particles of organics dispersed in vapors of water and gas, each of said particles having a diameter of about one micron or less, and said aerosols having an initial temperature of about 350 degrees F., the improvement comprising the steps of cooling said hot aerosols by passing them over finned cooling coils to form a two-phase condensate of a first portion thereof comprising water and organics, spraying said cooling coils with said two-phase condensate with a pressure of at least 80 pounds per square inch to agglomerate a second portion of said aerosols, blowing the remainder of said aerosols through a mist eliminator to filter said organics and water therefrom as a two-phase filtrate, and collecting said two-phase condensate and said two-phase filtrate.

2. In a process of removing air pollutants from oven-stack emissions as described in claim 1, said step of cooling said areosols comprises, in addition, pumping a coolant in a closed system through said finned cooling coils, said coolant being physically separate from said two-phase condensate.

3. In a process of removing air pollutants from oven-stack emissions as described in claim 2, said step of spraying said cooling coils comprising, in addition, spraying said cooling coils from opposite sides thereof with said two-phase condensate with a pressure of between about eighty and one hundred pounds per square inch.

4. In a system wherein hot noxious aerosols are formed in oven-stack emissions, said aerosols comprising particles of organics dispersed in vapors of water and gas, each of said particles having a diameter of about one micron or less, and said aerosols having an initial temperature of about 350 degrees F., improved apparatus for removing said aerosols comprising a spray chamber, conduit means communicating with said oven-stack emissions and said spray chamber to direct said hot aerosols to said spray chamber, a plurality of finned cooling coils in said spray chamber, a closed coolant system including said finned cooling coils for cooling said cooling coils with a coolant, whereby to cool and to condense a portion of said aerosols, as a two-phase condensate, in said spray chamber, spraying means disposed adjacent said cooling coils within said spray chamber, a high-pressure pumping system for pumping said two-phase condensate through said spraying means with a pressure of at least 80 p.s.i., a mist eliminator, conduit means communicating said spray chamber with said mist eliminator whereby to filter, as a two-phase filtrate, any aerosols passing from said spray chamber to said mist eliminator, said coolant being physically separate from said two-phase condensate, whereby said coolant is not contaminated by said two-phase condensate, said spraying means comprising spray nozzles disposed on opposite sides of said cooling coils, said high-pressure pumping system comprising means to agglomerate a portion of said aerosols in said spray chamber and means to clean any of said organics that may stick to said finned cooling coils, blower means in said conduit means communicating with said mist eliminator, whereby to blow aerosols from said spray chamber to said mist eliminator, and means to separately collect said two-phase condensate and said two-phase filtrate, whereby to recover said organics.

References Cited

UNITED STATES PATENTS

| | | | |
|---|---|---|---|
| 682,050 | 9/1901 | Erben | 55—80 X |
| 692,415 | 2/1902 | Baker | 55—222 |
| 2,147,248 | 2/1939 | Fleisher | 55—90 X |
| 3,473,298 | 10/1969 | Berman | 55—222 |

OTHER REFERENCES

Brink, Jr.: "Air Pollution Control with Fiber Mist Eliminators" from The Canadian Journal of Chemical Engineering (Reprint), June 1963, pp. 134–138.

REUBEN FRIEDMAN, Primary Examiner

C. N. HART, Assistant Examiner

U.S. Cl. X.R.

55—259